(12) United States Patent
Lu et al.

(10) Patent No.: US 9,380,541 B1
(45) Date of Patent: Jun. 28, 2016

(54) MANAGING SPECIFIC ABSORPTION RATE DISTRIBUTION TO MAXIMIZE TRANSMIT POWER OF A WIRELESS DEVICE

(71) Applicant: QUALCOMM Incorporated, San Diego, CA (US)

(72) Inventors: Lin Lu, San Diego, CA (US); Jagadish Nadakuduti, La Jolla, CA (US); Paul Guckian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/728,892

(22) Filed: Jun. 2, 2015

(51) Int. Cl.
*H04B 1/10* (2006.01)
*H04W 52/18* (2009.01)

(52) U.S. Cl.
CPC .................................... *H04W 52/18* (2013.01)

(58) Field of Classification Search
CPC .............................. H04W 52/16; H04W 52/18
USPC ...................... 455/63.4, 103, 115.3
See application file for complete search history.

(56) References Cited

U.S. PATENT DOCUMENTS

| 6,919,845 | B2 | 7/2005 | Ozaki et al. | |
|---|---|---|---|---|
| 2012/0021707 | A1* | 1/2012 | Forrester | H04W 52/281 455/103 |
| 2012/0197106 | A1 | 8/2012 | Cloos et al. | |
| 2013/0122827 | A1* | 5/2013 | Ali | H04B 1/3838 455/77 |
| 2013/0178167 | A1* | 7/2013 | Lockerbie | H04B 1/3838 455/63.4 |
| 2013/0237272 | A1 | 9/2013 | Prasad | |
| 2014/0273819 | A1 | 9/2014 | Nadakuduti et al. | |
| 2014/0274190 | A1 | 9/2014 | Lu et al. | |

* cited by examiner

*Primary Examiner* — Tu X Nguyen
(74) *Attorney, Agent, or Firm* — Loza & Loza LLP (57) ABSTRACT

Embodiments described herein provide a method and apparatus for determining a maximum transmitter power for a mobile device. First, a maximum specific absorption rate (SAR) value is determined. Then, a maximum transmitter power based on the maximum SAR value is determined. The maximum SAR value may be determined using any or all of the following methods: using a composite worst-case SAR map, determining a usage position of the mobile device, and a running average of transmitter power. A further embodiment provides an apparatus for managing transmitter power. The apparatus includes a modem that is in communication with a transmitter; a processor in communication with the modem; and a memory in communication with the processor.

5 Claims, 12 Drawing Sheets

LEFT CHEEK POSITION

LEFT TILT POSITION

MANAGING SPECIFIC ABSORPTION RATE DISTRIBUTION TO MAXIMIZE TRANSMIT POWER OF A WIRELESS DEVICE

FIELD

The present disclosure relates generally to wireless communication systems, and more particularly to a method and apparatus for managing specific absorption rate (SAR) distribution to maximize transmit power of a wireless device.

BACKGROUND

Wireless communication devices have become smaller and more powerful as well as more capable. Increasingly users rely on wireless communication devices for mobile phone use as well as email and Internet access. At the same time, devices have become smaller in size. Devices such as cellular telephones, personal digital assistants (PDAs), laptop computers, and other similar devices provide reliable service with expanded coverage areas. Such devices may be referred to as mobile stations, stations, access terminals, user terminals, subscriber units, user equipments, and similar terms.

A wireless communication system may support communication for multiple wireless communication devices at the same time. In use, a wireless communication device may communicate with one or more base stations by transmissions on the uplink and downlink. Base stations may be referred to as access points, Node Bs, or other similar terms. The uplink or reverse link refers to the communication link from the wireless communication device to the base station, while the downlink or forward link refers to the communication from the base station to the wireless communication devices.

Wireless communication systems may be multiple access systems capable of supporting communication with multiple users by sharing the available system resources, such as bandwidth and transmit power. Examples of such multiple access systems include code division multiple access (CDMA) systems, time division multiple access (TDMA) systems, frequency division multiple access (FDMA) systems, wideband code division multiple access (WCDMA) systems, global system for mobile (GSM) communication systems, enhanced data rates for GSM evolution (EDGE) systems, and orthogonal frequency division multiple access (OFDMA) systems.

Wireless devices, including mobile telephones are required to undergo testing to determine the amount of RF energy a user may be exposed to when using the device. In the U.S., the Federal Communications Commission (FCC) certifies mobile devices to ensure compatibility with requirements and user safety. The maximum power that a mobile device may use when transmitting is affected by the fact that users position the device against their head and body. The close proximity or contact is behind the FCC requirements setting limits on the specific absorption rate. SAR is defined as the power absorbed per unit mass of tissue in mW/g by regulatory bodies, including the FCC. Current FCC testing requirements allow for a finite separation distance between the smartphone and the torso portion of a human phantom.

FCC certification of wireless devices requires SAR measurements be taken by attaching the wireless device to a phantom (representing the human body). This phantom is filled with a tissue simulating liquid. The required measurements are taken in five positions relative to the human body and produce five different SAR distributions. Additional SAR measurements are also required at multiple channels in a given frequency band for a particular antenna and transmitter combination. The FCC reviews the data from all positions and channels, resulting in the reporting of hundreds of measurements for all bands, transmitter, and antenna combinations.

The testing is used to determine maximum transmitter power for the band, transmitter, and antenna combination. The result may be a limitation on transmitter power. Current FCC testing allows for a finite separation distance between the mobile device and the flat body phantom. As the use of smartphones increases and the devices used in pockets and worn on the body, the FCC may require SAR testing with zero separation distance. This will drastically reduce the maximum allowable transmit power. If the position of the phone could be detected, then a higher transmitter power may be allowed when the device is positioned against the user's head.

The testing procedures described above results in a SAR limit based on the maximum average power. However, the current compliance test procedure effectively results in enforcing an instantaneous power-based SAR, which results in an overly conservative power limit.

There is a need in the art for a method of managing SAR to determine a composite SAR distribution to estimate worst-case exposure, determine device positioning to maximize transmit power in some usage positions, and computing an accurate running average of transmit power.

SUMMARY

Embodiments described herein provide a method for determining a maximum transmitter power for a mobile device. First, a maximum specific absorption rate (SAR) value is determined. Then, a maximum transmitter power based on the maximum SAR value is determined. The maximum SAR value may be determined using any or all of the following methods: using a composite worst-case SAR map, determining a usage position of the mobile device, and a running average of transmitter power.

A further embodiment provides an apparatus for managing transmitter power. The apparatus includes a modem that is in communication with a transmitter; a processor in communication with the modem; and a memory in communication with the processor.

A still further embodiment provides an apparatus for determining maximum transmitter power. The apparatus includes: means for determining a maximum specific absorption rate (SAR) value and means for determining a maximum transmitter power based on the maximum SAR value. The means for determining a maximum SAR value may use a worst-case composite SAR map and may also use a usage position of a user. The means for determining maximum transmitter power may also use a running average transmitted power.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

As used in this application, the terms "component," "module," "system," and the like are intended to refer to a computer-related entity, either hardware, firmware, a combination of hardware and software, software, or software in execution. For example, a component may be, but is not limited to being, a process running on a processor, an integrated circuit, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network, such as the Internet, with other systems by way of the signal).

Furthermore, various aspects are described herein in connection with an access terminal and/or an access point. An access terminal may refer to a device providing voice and/or data connectivity to a user. An access wireless terminal may be connected to a computing device such as a laptop computer or desktop computer, or it may be a self-contained device such as a cellular telephone. An access terminal can also be called a system, a subscriber unit, a subscriber station, mobile station, mobile, remote station, remote terminal, a wireless access point, wireless terminal, user terminal, user agent, user device, or user equipment. A wireless terminal may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. An access point, otherwise referred to as a base station or base station controller (BSC), may refer to a device in an access network that communicates over the air-interface, through one or more sectors, with wireless terminals. The access point may act as a router between the wireless terminal and the rest of the access network, which may include an Internet Protocol (IP) network, by converting received air-interface frames to IP packets. The access point also coordinates management of attributes for the air interface.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ), and integrated circuits such as read-only memories, programmable read-only memories, and electrically erasable programmable read-only memories.

Various aspects will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Other aspects, as well as features and advantages of various aspects, of the present invention will become apparent to those of skill in the art through consideration of the ensuring description, the accompanying drawings and the appended claims.

Figure 1:
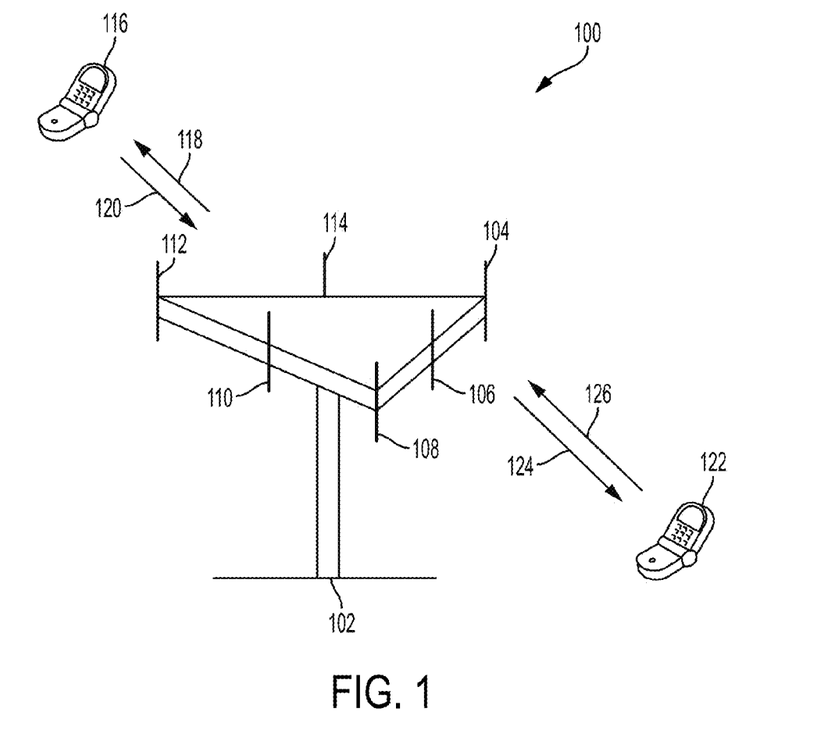
FIG. 1 illustrates a wireless multiple-access communication system, in accordance with certain embodiments of the disclosure.

FIG. 1 illustrates a multiple access wireless communication system 100 according to one aspect. An access point 102 (AP) includes multiple antenna groups, one including 104 and 106, another including 108 and 110, and an additional one including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over downlink or forward link 118 and receive information from access terminal 116 over uplink or reverse link 120. Access terminal 122 is in communication with antennas 106 and 108, where antennas 106 and 108 transmit information to access terminal 122 over downlink or forward link 124, and receive information from access terminal 122 over uplink or reverse link 126. In a frequency division duplex (FDD) system, communication link 118, 120, 124, and 126 may use a different frequency for communication. For example, downlink or forward link 118 may use a different frequency than that used by uplink or reverse link 120.

Each group of antennas and/or the area in which they are designed to communicate is often referred to as a sector of the access point. In an aspect, antenna groups are each designed to communicate to access terminals in a sector of the areas covered by access point 102.

In communication over downlinks or forward links 118 and 124, the transmitting antennas of an access point utilize beamforming in order to improve the signal-to-noise ration (SNR) of downlinks or forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as a Node B, an evolved Node B (eNB), or some other terminology. An access terminal may also be called a mobile station, user equipment (UE), a wireless communication device, terminal or some other terminology. For certain aspects, either the AP 102, or the access terminals 116, 122 may utilize the techniques described below to improve performance of the system.

Figure 2:
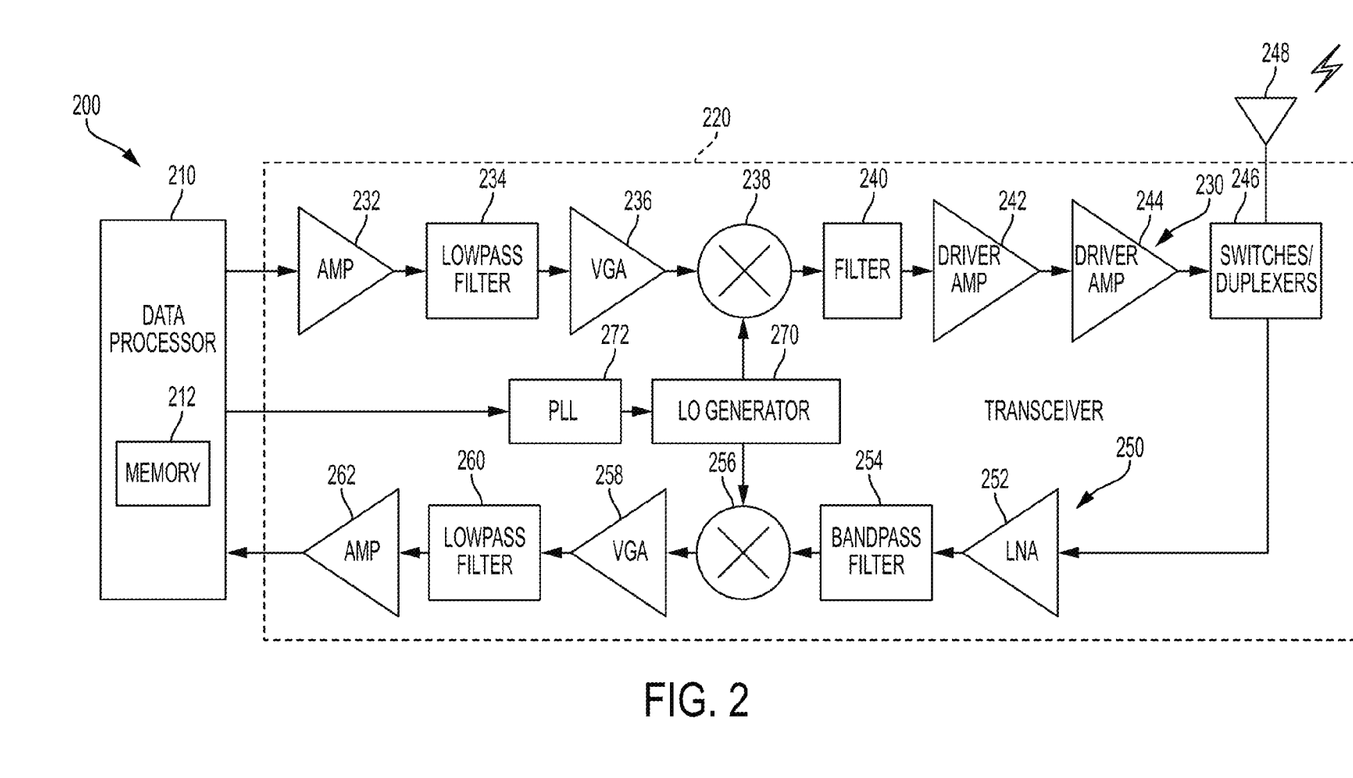
FIG. 2 is a block diagram of a wireless communication system in accordance with embodiments of the disclosure.

FIG. 2 shows a block diagram of an exemplary design of a wireless communication device 200. In this exemplary design, wireless device 200 includes a data processor 210 and a transceiver 220. Transceiver 220 includes a transmitter 230 and a receiver 250 that support bi-directional wireless communication. In general, wireless device 200 may include any number of transmitters and any number of receivers for any number of communication systems and any number of frequency bands.

In the transmit path, data processor 210 processes data to be transmitted and provides an analog output signal to transmitter 230. Within transmitter 230, the analog output signal is amplified by an amplifier (Amp) 232, filtered by a lowpass filter 234 to remove images caused by digital-to-analog conversion, amplified by a VGA 236, and upconverted from baseband to RF by a mixer 238. The upconverted signal is filtered by a filter 240, further amplified by a driver amplifier, 242 and a power amplifier 244, routed through switches/duplexers 246, and transmitted via an antenna 249.

In the receive path, antenna 248 receives signals from base stations and/or other transmitter stations and provides a received signal, which is routed through switches/duplexers 246 and provided to receiver 250. Within receiver 250, the received signal is amplified by an LNA 252, filtered by a bandpass filter 254, and downconverted from RF to baseband by a mixer 256. The downconverted signal is amplified by a VGA 258, filtered by a lowpass filter 260, and amplified by an amplifier 262 to obtain an analog input signal, which is provided to data processor 210.

FIG. 2 shows transmitter 230 and receiver 250 implementing a direct-conversion architecture, which frequency converts a signal between RF and baseband in one stage. Transmitter 230 and/or receiver 250 may also implement a super-heterodyne architecture, which frequency converts a signal between RF and baseband in multiple stages. A local oscillator (LO) generator 270 generates and provides transmit and receive LO signals to mixers 238 and 256, respectively. A phase locked loop (PLL) 272 receives control information from data processor 210 and provides control signals to LO generator 270 to generate the transmit and receive LO signals at the proper frequencies.

FIG. 2 shows an exemplary transceiver design. In general, the conditioning of the signals in transmitter 230 and receiver 250 may be performed by one or more stages of amplifier, filter, mixer, etc. These circuits may be arranged differently from the configuration shown in FIG. 2. Some circuits in FIG. 2 may also be omitted. All or a portion of transceiver 220 may be implemented on one or more analog integrated circuits (ICs), RF ICs (RFICs), mixed-signal ICs, etc. For example, amplifier 232 through power amplifier 244 in transmitter 230 may also be implemented on an RFIC. Driver amplifier 242 and power amplifier 244 may also be implemented on another IC external to the RFIC.

Data processor 210 may perform various functions for wireless device 200, e.g., processing for transmitter and received data. Memory 212 may store program codes and data for data processor 210. Data processor 210 may be implemented on one or more application specific integrated circuits (ASICs) and/or other ICs.

Wireless devices, such as mobile phones used in the network described above in FIG. 1 generate transmit power that, at high levels, may harm users. This transmit power is used to access the network and is generated by the transmit chain described in FIG. 2. The transmit power of the mobile device at high levels is capable of adversely affecting human health and safety.

SAR is a measure of the rate at which energy is absorbed by the human body when exposed to an RF electromagnetic field. SAR is defined as the power absorbed per mass of tissue, and has units of watts per kilogram (W/Kg). SAR may be either averaged over the entire body, known as whole body exposure, or averaged over a smaller sample volume (typically 1 g or 10 g of tissue), known as localized exposure. The resulting value cited is the maximum level measured in the body part studied over the stated volume or mass.

The SAR for electromagnetic energy may be calculated from the electric field within the tissue as:

$$SAR = \int_{sample} \frac{\sigma(r)|E(r)|^2}{\rho(r)} dr$$

where σ is the sample electrical conductivity
E is the root mean square (RMS) electric field
ρ is the sample density
r covers the sample region of the body SAR measures exposure to RF fields between 100 kHz and 10 GHz (generally known as radio waves). It is commonly used to measure the power absorbed by the human body. The SAR value is significantly dependent on the geometry of the body part exposed to the RF energy, and also on the exact location and geometry of the RF source. As a result, each mobile device model must be tested with each specific source at the intended use position.

When measuring the SAR of a wireless device the device is placed at the head in a talk position or flat next to the body phantom. The SAR is then measured in the region of head/body phantom exposed by the wireless device in order to determine the highest SAR value. Typically, for a wireless device, the highest values of SAR are generated near the antenna. SAR values depend heavily on the size of the averaging volume.

The maximum transmit power a mobile device may use when transmitting in close proximity with humans is dictated by the limit set on SAR, that is, the power absorbed per unit of mass in tissue in mW/g. This limit is set by various regulatory bodies worldwide. In the U.S., the FCC sets SAR limits for mobile device transmitters.

Figure 3:
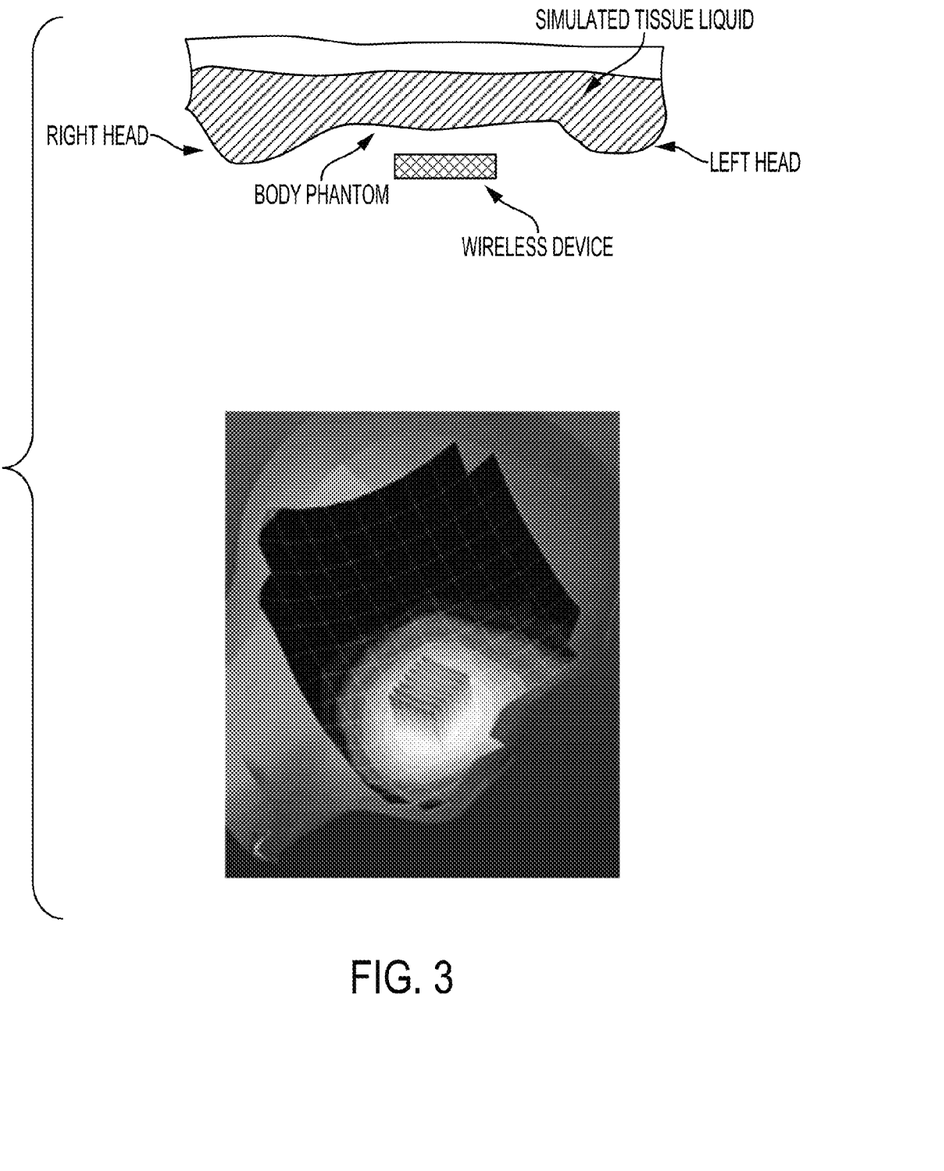
FIG. 3 illustrates a human phantom used for SAR testing and also illustrates a SAR distribution of a transmitter in accordance with embodiments of the disclosure.

For the body phantom SAR, current FCC testing allows for a finite separation distance between the smartphone device and a human phantom. FIG. 3 depicts the SAR measurement set up with a body phantom. At present, testing allows for a finite separation distance between the mobile device and the body phantom of approximately 10 mm. At this separation distance a mobile phone may transmit at a desired power level. As smartphones and other mobile devices become more heavily used and incorporated into daily life, it is possible that regulatory bodies may, in the near future, require SAR testing with closer or zero separation distance. This limitation will likely result in a drastic limitation on maximum transmit power.

Embodiments described below provide a method for determining a composite SAR distribution in order to estimate worst-case human exposure from usage of the wireless device. An additional embodiment provides a method for determining current SAR level and a maximum transmit power level by distinguishing the usage position of the wireless device. A still further embodiment provides a method for recording a timestamp of each transmission to aid in computing the average transmit power used to determine SAR level compliance of a multi-transmitter multi-mode wireless device.

In the US the FCC requires that wireless devices be certified before being offered for sale or use. The certification process requires spatial specific absorption rate (SAR) in W/kg measurements. These measurements are made by attaching the wireless device to a phantom representing the human body. The phantom is filled with a tissue simulating liquid. With the wireless device attached to the phantom measurements are taken in five positions: left cheek/tilt, right cheek/tilt, and flat body. Each measurement produces a different SAR distribution. Additional SAR measurements must be performed at low, mid, and high channel levels in a given band for the particular antenna and transmitter combination. Once the data has been collected the FCC reviews the data for all five position and channels for each band and mode. These requirements result in device manufacturers submitted hundreds of measurements for all bands and transmitter and antenna combinations.

FIG. 3 shows the spatial SAR distribution for an antenna located at the bottom of a mobile device. As shown in FIG. 3, the SAR is concentrated near the antenna location. Similar spatial distributions are produced for each band, antenna and transmitter combination.

Measured SAR is directly proportional to the average power of transmission. High SAR values result in reductions in transmitter power that may be more severe than warranted if a real-time SAR assessment were performed. Embodiments described herein provide a method for performing the SAR assessment over a given time window in real time to determine that maximum allowable transmitting power. The method uses pre-stored SAR distributions taken from the five positions and three channel tests performed for certification testing. An embodiment provides for a reduction in the total number of stored SAR distributions by combining SAR distributions to reduce memory and computation time and also reduce the data reported as part of the certification process. The embodiment provides that the composite SAR distribution or map is stored in the wireless device.

Presently, computing SAR values in real-time requires computation of the SAR for all five positions in real-time in order to identify the worst-case exposure scenario. The worst case value is used to compute conservative SAR estimation, which in turn results in a conservative value for maximum transmitting power. These computations and storage require significant on-device memory capability and computation resources.

Figure 4:
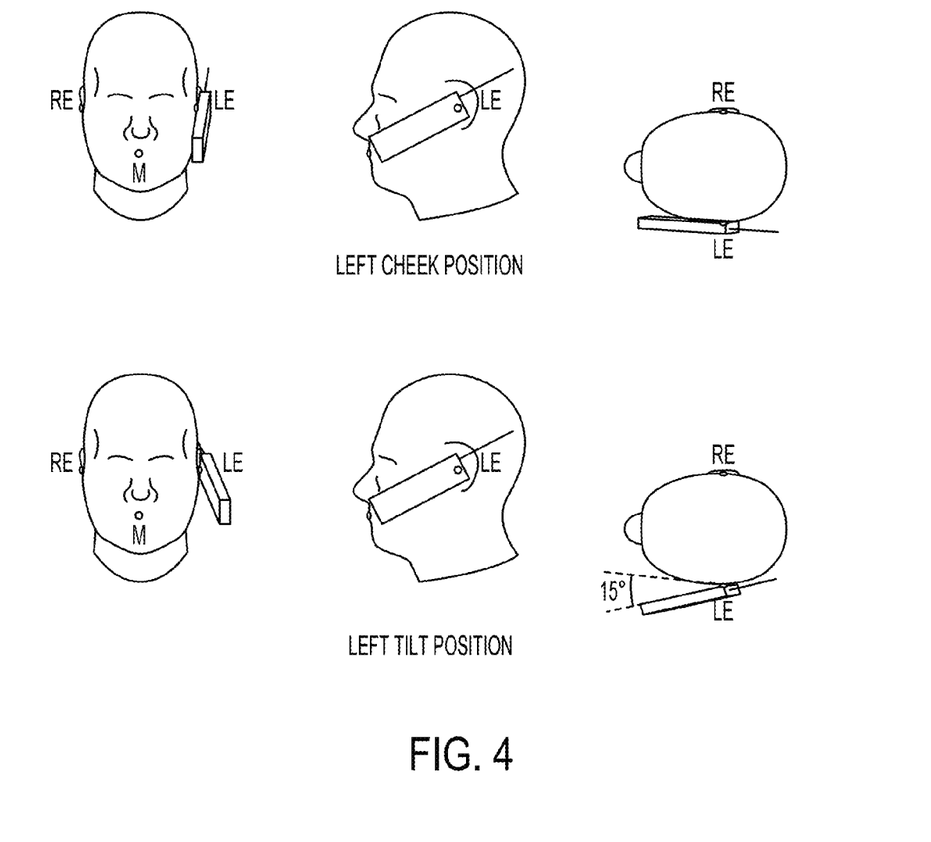
FIG. 4 depicts the left cheek and left tilt positions used in SAR testing, in according with embodiments of the disclosure.

FIG. 4 shows the positions required in SAR testing: a left cheek position, with the device held against the user's cheek and a left tilt position, with the device held out and away from the cheek. Similar positions on the right side of the user's head are also used in the measurements. A body measurement is also taken, as users may place the wireless device in a jacket pocket and use headphones.

An embodiment provides for creating a composite SAR map for all five positions and three channels by selecting the worst-case SAR values from each SAR map. This results in a conservative SAR estimation for the band being tested. Additionally, a composite SAR map may also be determined for different antenna tuning states. Antenna tuners installed in the wireless devices aid in tuning the antenna resonance to the desired frequency band taking into account various loading conditions in real time. For wireless devices employing antenna tuners, current FCC requirements recommend testing SAR in all antenna tuner states. In such a case, SAR maps for all antenna tuner states may also be combined into one composite SAR map for the band being tested.

Figure 5:
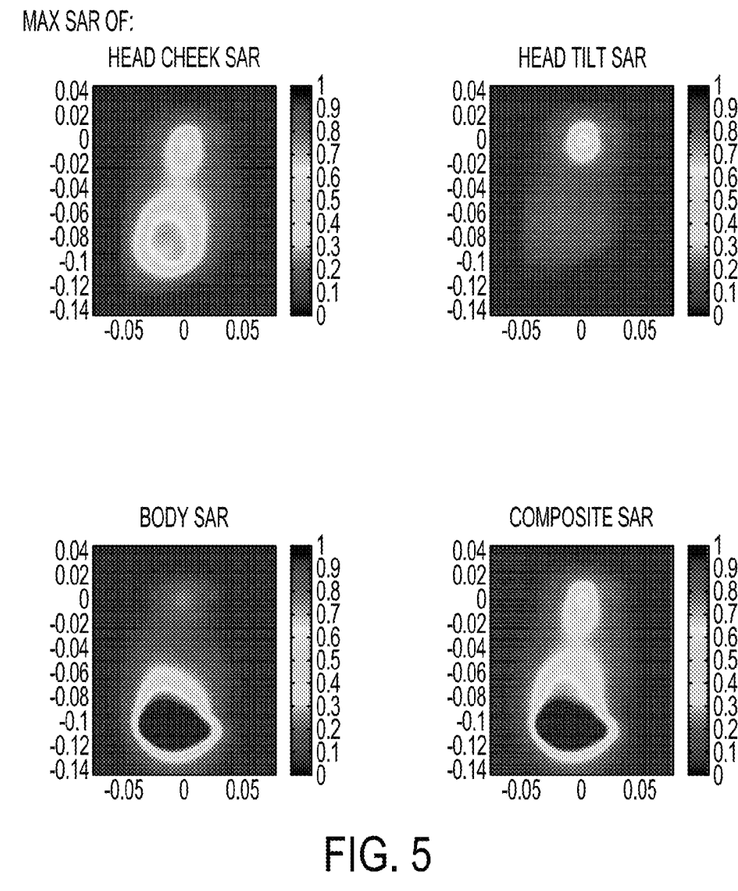
FIG. 5 illustrates creation of a composite SAR map, in accordance with embodiments of the disclosure.

FIG. 5 illustrates the creation of a composite SAR map. The maximum SAR of the head cheek SAR is combined with the maximum SAR of the head tilt SAR and the body SAR. Both the left and right cheek and tilt positions may be included in the composite SAR map. The combination SAR map with the worst-case regions combined is shown as the composite SAR map. All of the 1 g or 10 g averaged distributions may be used in creating the composite SAR map. When combining left head and right head SAR maps, mirror images along the vertical axis of SAR map for one side (either left or right) of the head may be used to determine composite SAR map. The mirror image of the SAR map is used in some instances in order to maintain the antenna location fixed relative to the SAR map for both left and right head positions, e.g., for an antenna located in bottom left corner, SAR hotspot should be in the bottom left corner of the SAR map for both left cheek and right cheek positions. If the SAR hotspot is in the bottom right corner, then for that SAR map, a mirror image should be performed before combining multiple SAR maps. If mirror imaging is not performed, in some instances, the SAR hotspot distribution in the composite SAR map may be much wider, and may not be a true representation of actual exposure, and may result in a greater restriction of allowable transmit power. The composite SAR map for a given band and transmitter combination may be stored within the wireless device and used to perform real-time SAR analysis. The real-time SAR analysis may be used to control the maximum transmit power from multiple active transmitters on the wireless device. Since the user may position the wireless device in any position, the composite SAR map yields a conservative estimate of the SAR at all times. In addition, if head and body usage positions can be distinguished it is possible to store one composite SAR map for head usage positions, and another composite SAR map for body usage to maximize the transmit power. Typically, the body SAR position results in a greater restriction on transmitter power than a head position usage.

Currently FCC testing allows for a finite separation distance between the mobile device and the flat body phantom. This distance may be approximately 10 mm. with increasing usage of wireless devices in pockets and worn on the body, the FCC may require testing with zero separation distance to provide greater user safety. Body position use results in a greater restriction on maximum transmitter power than does head usage. A further embodiment provides for a method to distinguish head usage of a wireless device from body usage of a wireless device.

Figure 11:
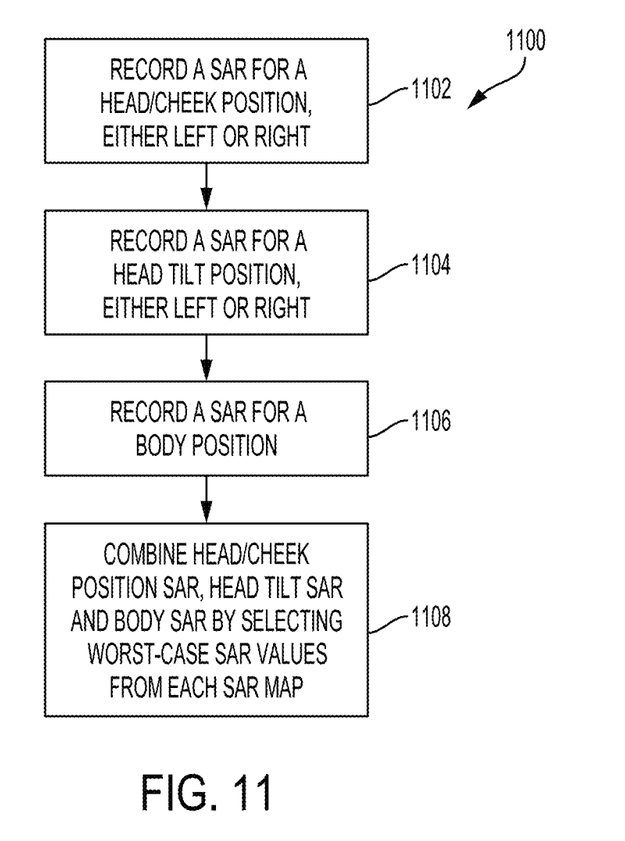
FIG. 11 is a flowchart of a method for computing a composite SAR map, in accordance with embodiments of the invention.

FIG. 11 is a flowchart of a method of computing a composite SAR map based on multiple position SAR maps. The method 1100 begins when a SAR is recorded for either a left of right head/cheek position SAR. Either left or right SAR or both SAR values may be recorded. In step 1104 a SAR is recorded for a head tilt position, either left or right, or both. Then in step 1106 a body position SAR is recorded. In step 1108 the head/cheek position worst-case SAR values are combined with the worst-case SAR values for head tile and the body SAR values. In step 1108, before combining multiple SAR maps, and when warranted, a mirror image along the vertical axis of the SAR maps should be performed in order to keep the transmitting antenna location fixed relative to the SAR hotspot for all maps. This worst-case combination SAR is then used to determine the maximum transmitter power allowable.

Figure 6:
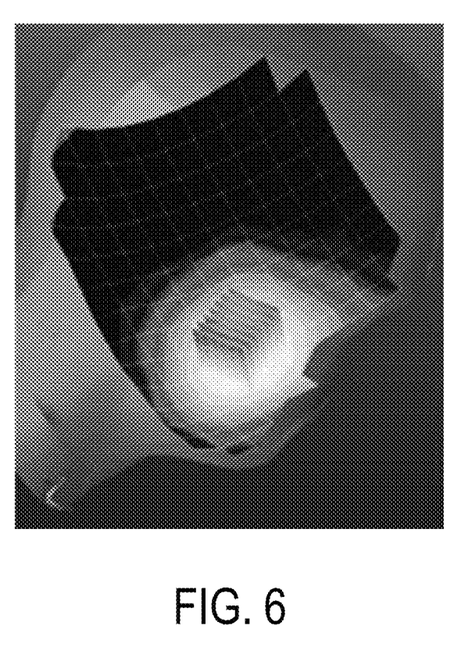
FIG. 6 shows the head SAR distribution, in accordance with embodiments of the disclosure.

FIG. 6 illustrates a head SAR distribution pattern produced by a wireless device. The illustration shows the transmitter and the SAR distribution when the wireless device is used. The maximum transmit power level is different for head position use and body position use. By detecting the usage position transmit power levels may be maximized. In crowded bands or more remote locations, maximizing transmitter power may result in more successful wireless device performance.

Figure 7:
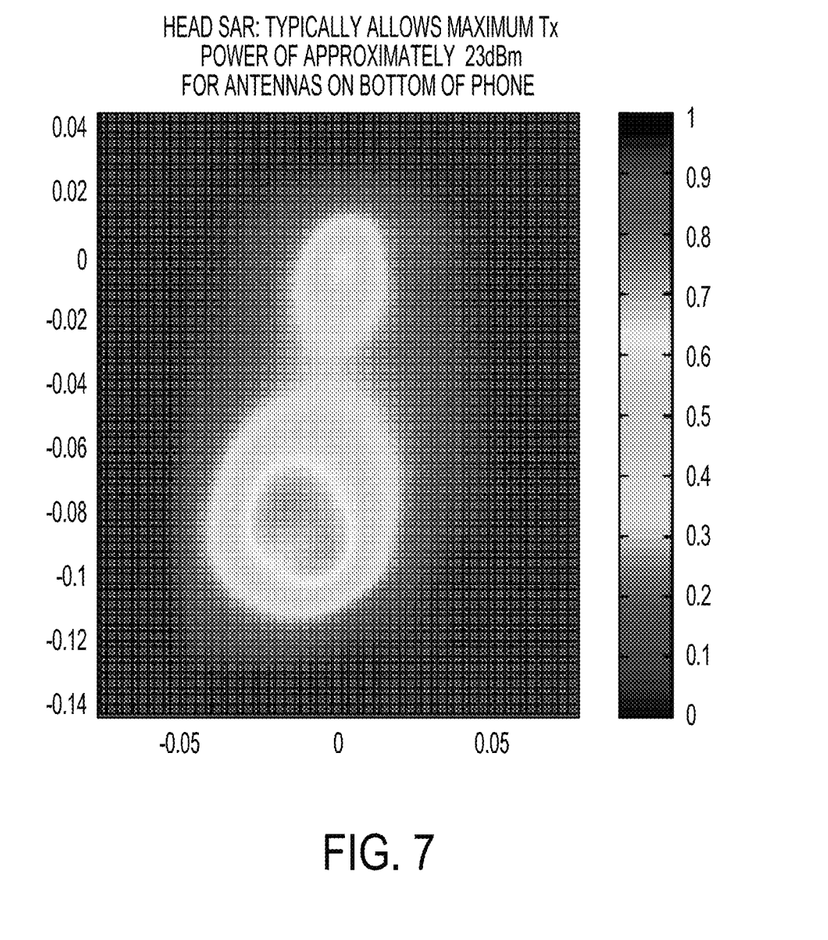
FIG. 7 illustrates head SAR distribution for antennas located at the bottom of a wireless device, in accordance with embodiments of the disclosure.

FIG. 7 illustrates a typical head position usage SAR distribution. This device position typically allows a maximum transmitter power of approximately 23 dBm for antennas located at the bottom of the device.

Figure 8:
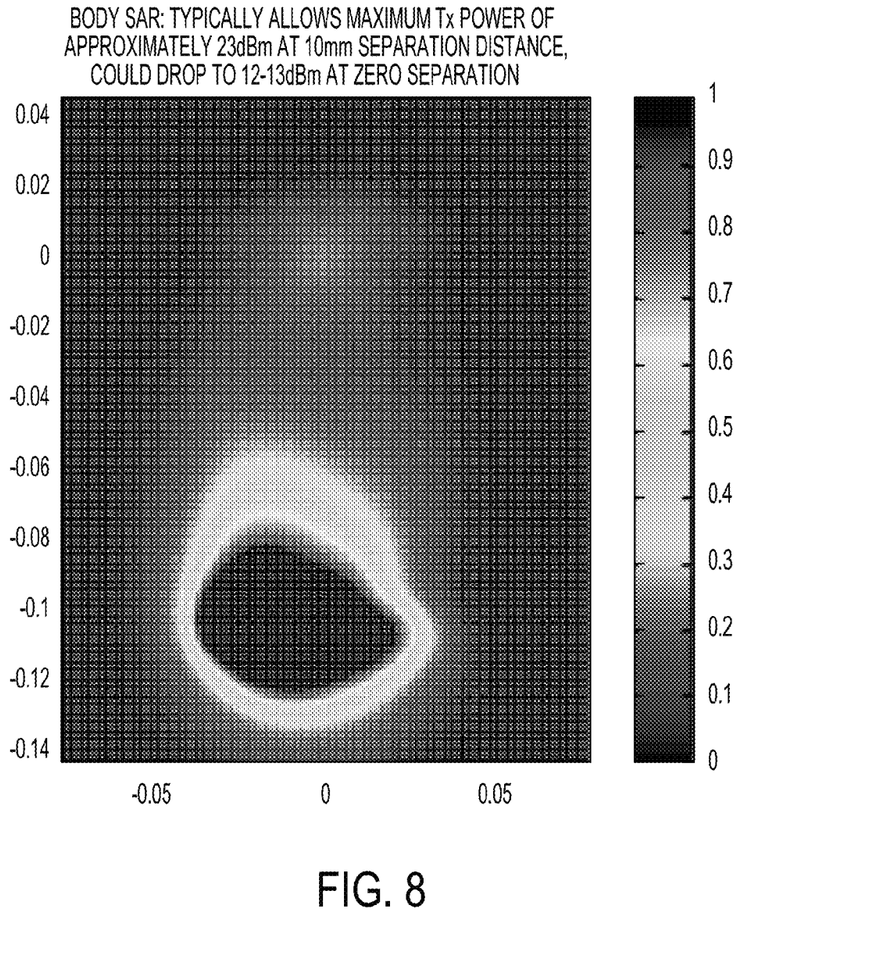
FIG. 8 depicts body SAR readings and affect on separation distance, in accordance with embodiments of the disclosure.

FIG. 8 shows a typical body usage SAR distribution. This device position typically allows a maximum transmitter power of approximately 23 dBm at a 10 mm separation distance. If a zero separation distance is mandated, then the maximum transmitter power drops to 12-13 dBm, a significant reduction.

Figure 12:
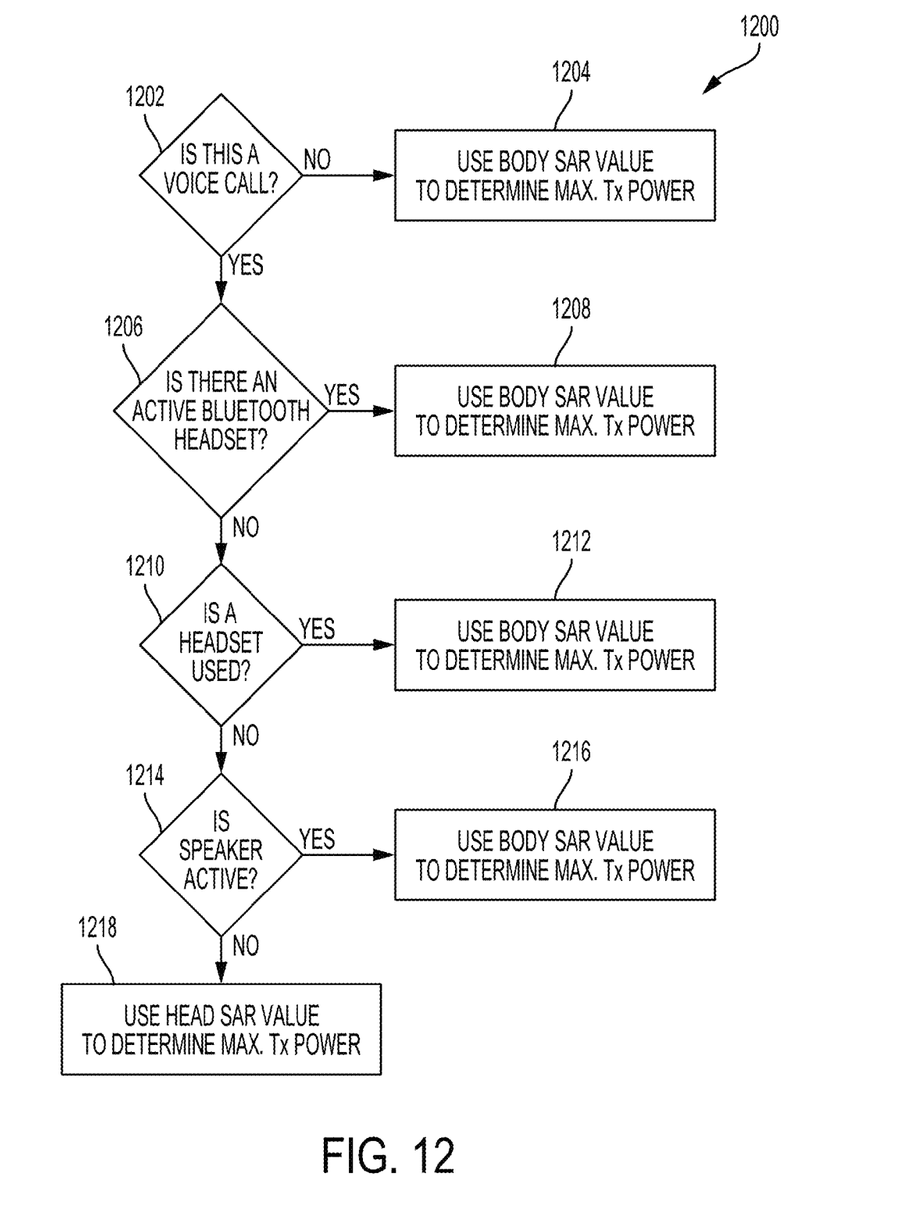
FIG. 12 is a flowchart of determine a usage position of a mobile device, in accordance with embodiments of the invention.

FIG. 12 is a flowchart of a method of determining a usage position of a wireless device, in accordance with embodiments described herein. The method 1200 begins in step 1202 where the query "Is this a voice call?" is answered. A voice call is likely to be conducted in a head position, either against the cheek or in the head tilt position described above, If the answer is No, this is not a voice call, then in step 1204 the body SAR value may be used to determine the maximum transmitter power. If the answer is Yes, then in step 1206 the query is posed "is there an active bluetooth headset?" If then answer is Yes, then a user is likely using the mobile device while it is positioned against the body, and may be placed in a pocket directly against the users' body. In this case, then in step 1208 the body SAR value is used to determine the maximum transmitter power. If the answer is no, then the method proceeds to step 1210 where the query "Is a headset used?" posed. If the answer is yes, then in step 1212 the body SAR value is used, as use of a headset indicates that the wireless device is likely to be positioned against the users' body. If the answer is no, then the method proceeds to step 1214 where the query "Is the speaker active?" is posed. If the answer is yes, then the body SAR value should be used to determine the maximum transmitter power as the device is likely being held away from the users' head, and against the body. If the answer is no, then in step 1218 the head SAR value should be used to compute the maximum transmitter power.

A further embodiment provides for identifying head usage versus body usage of a wireless device without any additional sensors other than those currently provided on the wireless device. Head usage may be determined by: detecting a voice call and not detecting an active remotely connected headset. In addition, head usage may also be determined by failing to detect headset presence in an audio jack, and failing to detect an activated speaker. Under these conditions the user has positioned the wireless device in one of the head usage positions. In this scenario, a head usage SAR composite map may be used to determine the maximum transmitter power. This maximizing of transmit power may be used even when multiple transmitters are active. If an active remotely connected headset is found or an audio jack indicates a headphone, or there is an activated speaker, then it is assumed that the wireless device is being used against the body and the body composite SAR map is used to determine the maximum transmitter power.

A still further embodiment provides for computing an accurate running average transmit power. In the embodiment the running average transmit power is computed using recorded timestamps of the device clock. The timestamps are recorded each time the modem transmits, allowing an accurate running average transmitter power to be computed without affecting the battery of the wireless device. The accurate running average transmitter power is used in determining real-time maximum allowable transmitter power for a given time window.

Figure 9:
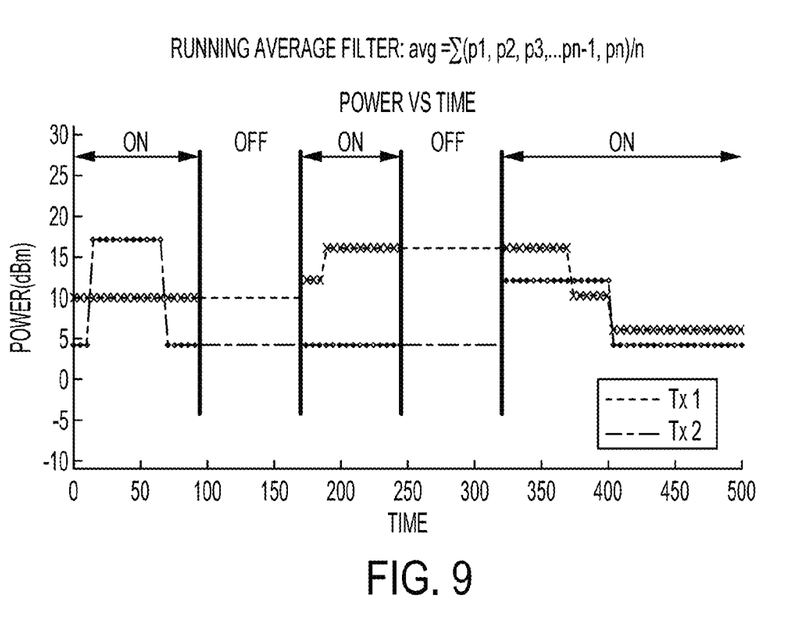
FIG. 9 shows the duty cycles of the running average filter, in accordance with embodiments of the disclosure.

FIG. 9 shows the duty cycle of a modem. As shown, the modem transmits during some periods and is off during other periods. In this example, a six minute window is used for averaging the transmitter power used by the modem. The methods records transmitter power versus time when the modem is turned on. The running average of the transmitter power may be continuously monitored during modem transmission. The timestamp is also recorded when the modem turns off. FIG. 9 shows the on and off patterns of two transmitters.

When the modem turns back on the timestamp is loaded and the transmit power for all instances when the modem was turned off are set to zero. The updated running average power is then computed. If the modem is turned off for a longer period of time than the averaging time window, then all past transmit power values may be replaced with a zero value. The averaging time window is six minutes based on current regulatory requirements, however, other time periods may also be used without altering the principle of operation.

Figure 10:
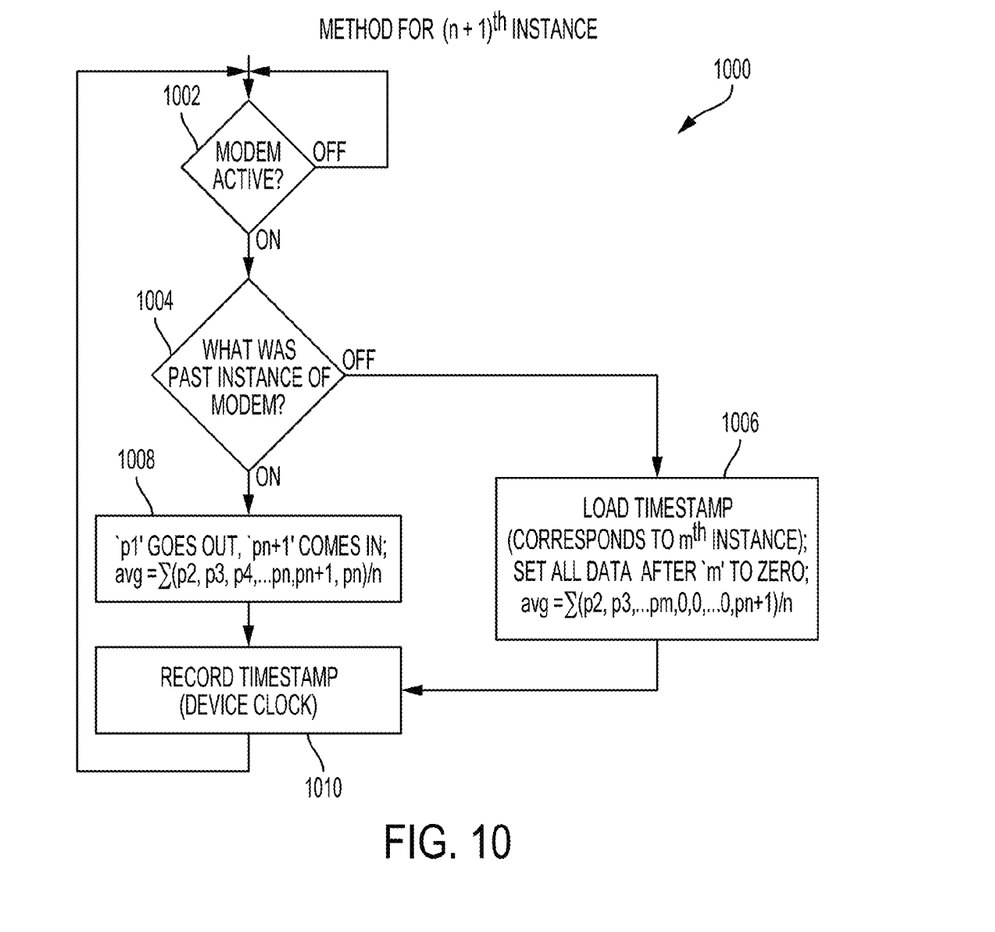
FIG. 10 is a flowchart of a method for computing a running average of transmit power, in accordance with embodiments of the disclosure.

FIG. 10 is a flowchart of a method of computing a running average transmit power. The method 1000 covers an $(n+1)^{th}$ instance of transmitter power. In step 1002 the first question is: is the modem active? If the modem is off then the process cycles back to the beginning. If the modem is on then the process continues to step 1004. In step 1004 the question is: what was the past instance of the modem. If the modem was off, then the process proceeds to steps 1006 and the time stamp is loaded. The timestamp corresponds to the mth instance and requires the following: set all data after 'm' to zero; and then average, where the average=$\Sigma$(p2, p3, ... pm, 0,0, ... 0, pn+1)/n is computed. If the modem is on or active, then the method proceeds to step 1008 where: p1' goes out of the averaging window, 'pn+1' comes in; and the average=$\Sigma$ (p2, p3, p4, ... pn, pn+1)/n is computed. Then in step 1010 the timestamp is recorded using the device clock. If the user changes the device clock, then the recorded timestamp should also be adjusted accordingly.

This embodiment maximizes transmit power using the real-time computed SAR, which is based on the average transmit power, computed as described above. The method above provides that averaging is continuously performed. The method provides that the monitoring may not be continued (thus, saving battery life), but the average does continue.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitter over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM EEPROM, CD-ROM or other optical disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A method of determining maximum transmitter power for a mobile device, comprising:
    determining a maximum specific absorption rate (SAR) value; and
    determining a maximum transmitter power based on the maximum SAR value, wherein the maximum SAR value is determined based on a composite SAR map, and further wherein the composite SAR map is computed using worst-case SAR distributions measured for at least one state of an antenna tuner for the band being tested, where the worst-case SAR distributions used to create the composite SAR map include left head cheek SAR, right head cheek SAR, left head tilt SAR, right head tilt SAR, body SAR, and low, medium, and high channels, and at least one antenna tuner state for a given frequency band.

2. A method of determining maximum transmitter power for a mobile device, comprising:
    determining a maximum specific absorption rate (SAR) value; and
    determining a maximum transmitter power based on the maximum SAR value, wherein the maximum transmitter power is determined using a maximum SAR value and a running average transmitter power and further comprising:
    recording a first timestamp when a modem is turned on;
    monitoring transmitter power when the modem is on;
    recording a second timestamp when the modem is turned off.

3. The method of claim 2, further comprising:
    loading the first and second timestamps into a processor;
    replacing transmit power values with zero for all timestamps where the modem is off; and
    computing a running average transmitter power using the timestamps when the modem is on.

4. The method of claim 3, wherein the running average transmitter power is computed over a predetermined averaging time window.

5. The method of claim 4, wherein if the modem is off for a duration of time longer than the predetermined averaging window all past transmitter values are set to zero when computing the running average transmitter power.

* * * * *